Jan. 1, 1946.　　　　J. G. ZUBER　　　　2,392,212
PHOTOGRAPHIC CAMERA
Filed June 17, 1942　　　　3 Sheets-Sheet 1
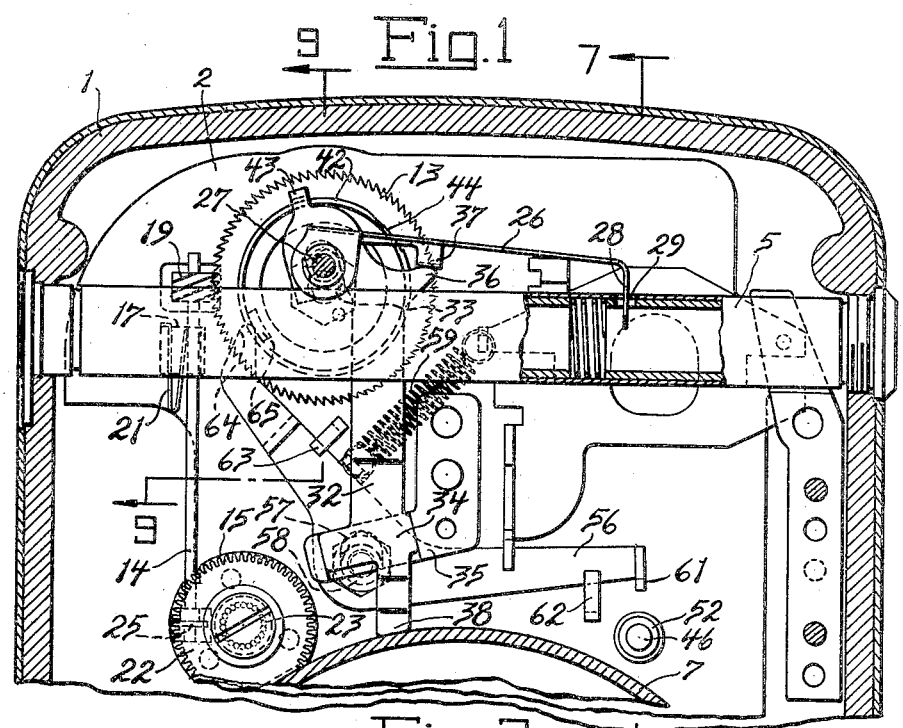
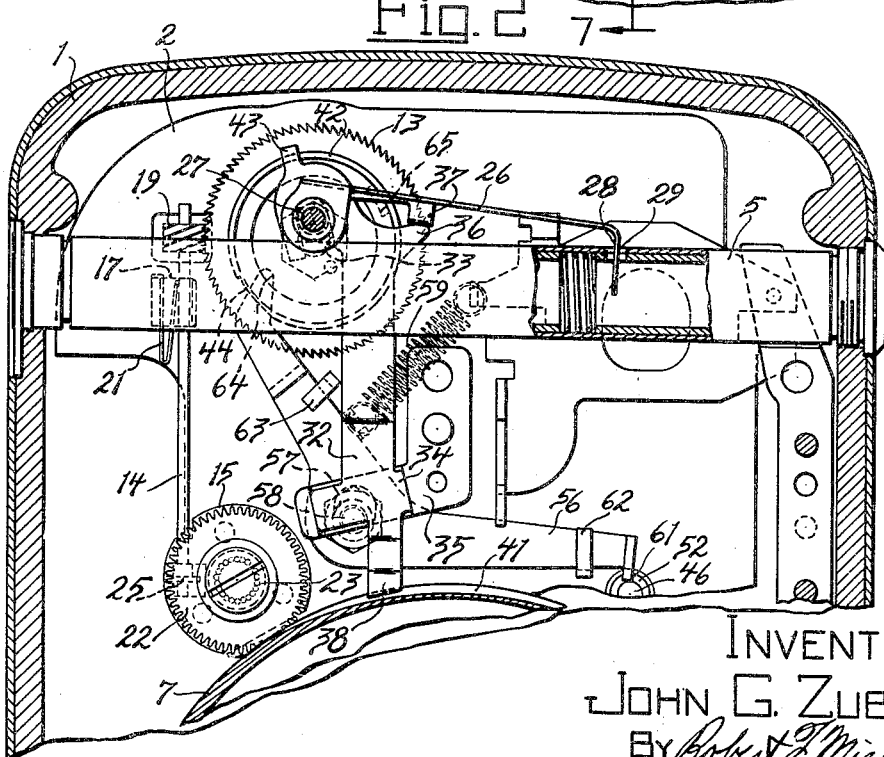
INVENTOR
JOHN G. ZUBER
BY Robert F. Miehle
ATTY.

Jan. 1, 1946. J. G. ZUBER 2,392,212
PHOTOGRAPHIC CAMERA
Filed June 17, 1942 3 Sheets-Sheet 2
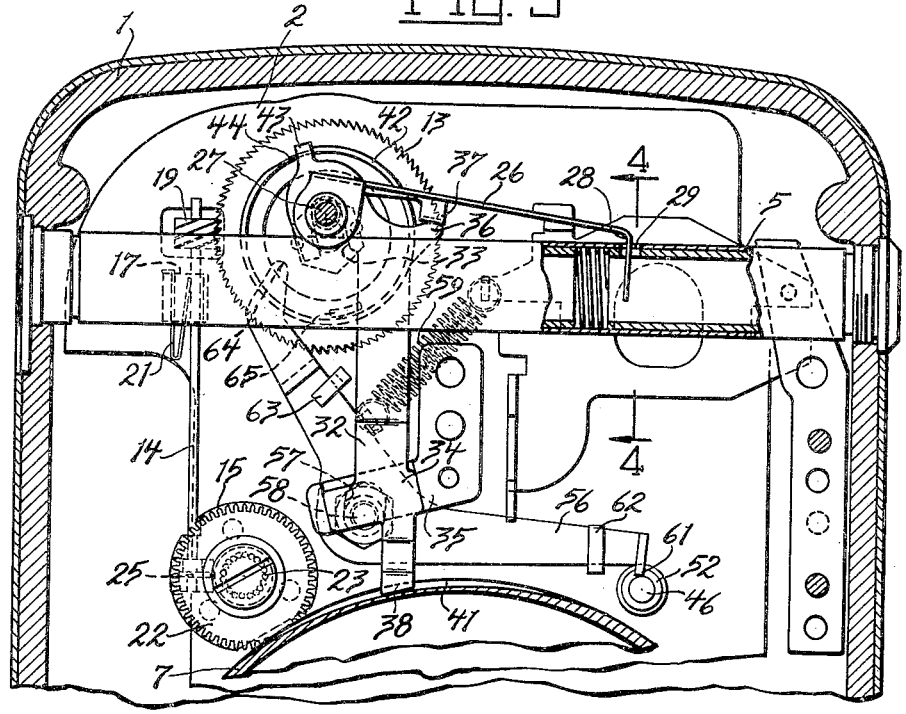
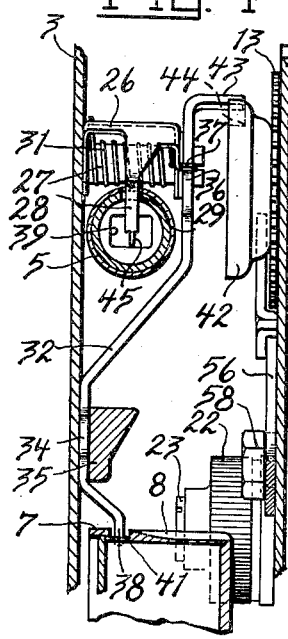 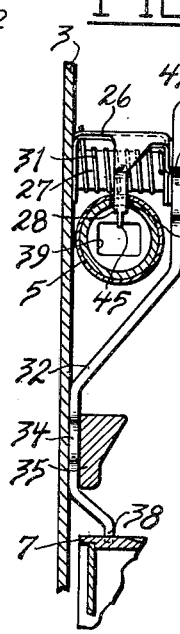 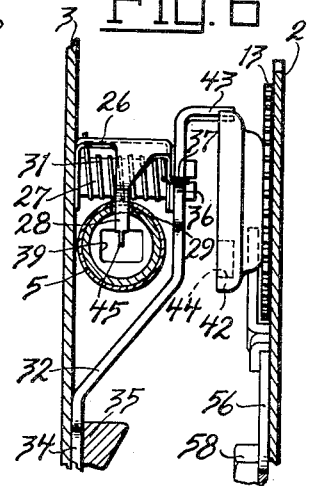
INVENTOR
JOHN G. ZUBER
BY Robert F. Miehle, Jr.
ATTY.

Jan. 1, 1946.  J. G. ZUBER  2,392,212
PHOTOGRAPHIC CAMERA
Filed June 17, 1942  3 Sheets-Sheet 3

INVENTOR
JOHN G. ZUBER
BY Robert J. Miehle
ATTY.

Patented Jan. 1, 1946

2,392,212

UNITED STATES PATENT OFFICE 2,392,212

PHOTOGRAPHIC CAMERA

John G. Zuber, Chicago, Ill., assignor to The Bell & Howell Company, Chicago, Ill., a corporation of Illinois Application June 17, 1942, Serial No. 447,313

4 Claims. (Cl. 88—16)

My invention relates particularly to a photographic camera of the sequential exposure or motion picture type involving a spring motor for driving the camera mechanism.

Objects of the invention reside in the novel and effective indication of both a predetermined run of the camera mechanism and predetermined portions of said run, the former for the instant purpose of indicating that the sequential exposure element or film strip in the camera has been fully exposed, and the latter for the instant purpose of indicating predetermined scene periods.

The invention will be more clearly understood by reference to the accompanying drawings in which—

Figures 1, 2 and 3 are similar partial side elevational sectional views of a magazine loading motion picture camera embodying my invention and showing the mechanism in different positions of its operation;

Figures 4, 5 and 6 are similar partial sectional views substantially on the line 4—4 of Figure 3 and showing the mechanism in different positions of its operation;

Figure 7:
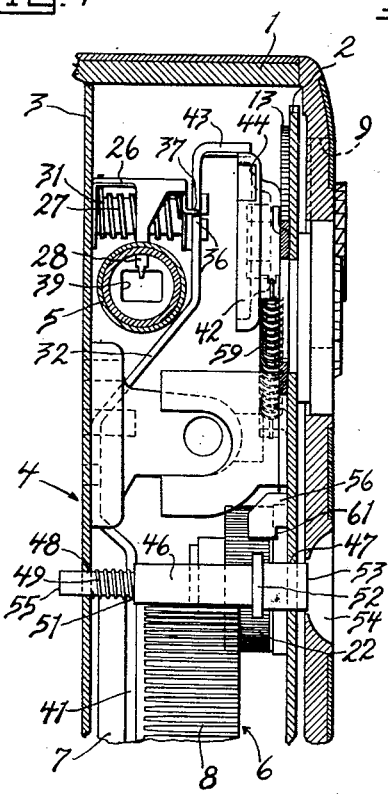
Figure 7 is a partial sectional view substantially on the line 7—7 of Figure 1.

Referring to the drawings, 1 designates generally a camera casing within which is secured a mechanism frame comprising frame plates 2 and 3 spaced transversely of the camera. The frame plate 2 is disposed adjacent a side wall of the casing while the frame plate 3 is disposed intermediate the side walls of the casing, thus providing a film magazine chamber, indicated at 4 in Figure 7, within the casing on the side of the plate 3 opposite that on which the plate 2 is disposed. A film magazine of a suitable type, not shown, is interchangeably accommodated within the film chamber 4 to provide a magazine loaded camera.

A view finder 5 of the direct vision type extends forwardly and rearwardly through the upper portion of the casing for viewing a scene being photographed.

Figure 8:
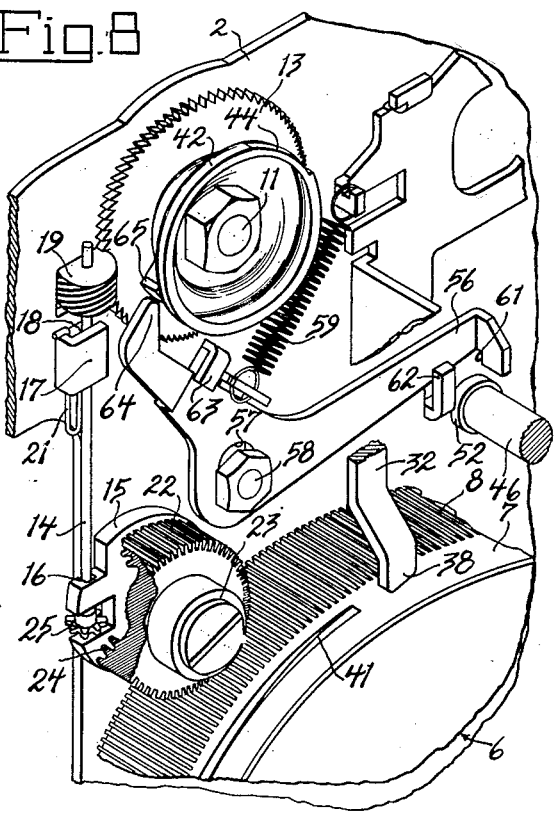
Figure 8 is a partial perspective view of the mechanism with parts broken away.

The mechanism of the camera, not shown, is driven by a spring motor, generally designated at 6 in Figures 7 and 8, and including a rotatable cylindrical driving member 7 driven by the spring of the motor and provided with a peripheral gear 8 for driving the camera mechanism.

Figure 9:
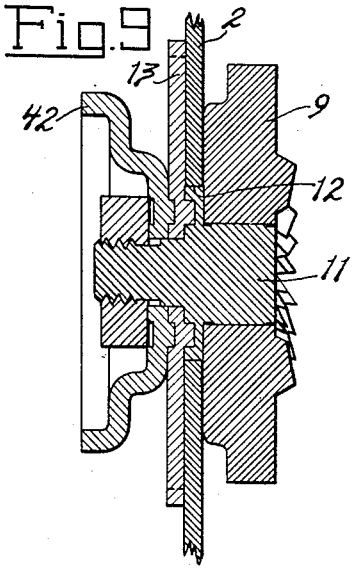
Figure 9 is an enlarged partial section substantially on the line 9—9 of Figure 1.

A film footage dial 9 facing outwardly of the camera casing is rotatably mounted by reason of it being secured on a shaft 11 which extends through and is journaled in a bore 12 through the frame plate 2 as best shown in Figure 9. A ratchet gear 13, at the inner face of the frame plate 2, is secured on the shaft 11. A vertical shaft 14 has its lower portion journaled by means of a bearing bracket 15 secured on the inner face of the plate 2 and provided with a vertical slot 16 engaging the shaft 14 and confining it against the inner face of the plate 2. The upper portion of the shaft 14 is journaled by means of a lug 17 struck from the plate 2 and extending parallel thereto to form a slot bearing 18 with the inner face of the plate 2 in which the shaft 14 is engaged.

A ratchet toothed worm gear 19 is secured on the upper end of the shaft 14 and is held in mesh with the ratchet gear 13 for driving the same by means of a U-shaped spring 21 arranged in the slot bearing 18 and engaging the shaft 14, the spring permitting the ratchet gear 13 to ratchet on the worm gear 19 for setting the footage dial 9.

Figure 10:
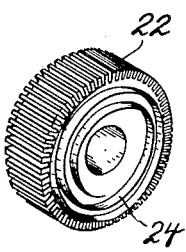
Figure 10 is a perspective view of one of the film footage dial driving gears hereinafter described.

A spur gear 22 is rotatably mounted on the bearing bracket 15, as designated at 23, and meshes with the gear 8 of the driving member 7 of the spring motor for the driving of the gear 22 therefrom. One face of the gear 22 is provided with a spiral gear tooth 24, as shown in Figures 8 and 10, and a star toothed gear 25 is secured on the lower end of the shaft 14 and meshes with the spiral gear tooth 24, thus completing a drive from the driving member 7 of the spring motor to the footage dial 9, this drive comprising a reduction drive train by reason of the reduction drive of the spiral gear tooth 24 meshing with the star gear 25 and the worm gear 19 meshing with the ratchet gear 13. Accordingly, the footage dial 9 operates a single revolution to a plurality of revolutions of the driving member 7 of the spring motor.

One end of a signal arm 26 is pivotally mounted on a stationary transversely disposed stud structure 27 secured on the frame plate 3, and the signal arm has its free end or signal portion, designated at 28, extending substantially at right angles to the main portion thereof and extending into the tube of the view finder through an opening 29 therethrough. In the pivotal movement of the arm 26, the end portion 28 thereof is movable into and out of signaling position visible in the view finder as hereinafter described. A torsion spring 31 encircles the stud structure 27 and operates between the stud structure and the signal arm 26 to yieldably urge the signal arm into signaling position or clockwise in Figures 1, 2 and 3.

A vertically disposed bar 32 is provided with a generally vertical slot 33 in the region of its upper end which is slidably engaged on the stud structure 27, and is provided with a bearing portion 34 in the region of its lower end which is slidably engaged in a generally vertical slide bearing 35 on the frame plate 3, the bar 32 being thus vertically movable. The upper portion of the bar 32 is provided with a lateral extension 36 which is engageable upwardly against a lateral extension 37 on the intermediate portion of the signal arm 26, so that upward movement of the bar 32 effects movement of the signal arm, against the influence of the spring 31, in the direction of its non-signaling position or counterclockwise in Figures 1, 2 and 3.

The lower end of the bar 32, designated at 38, is engageable downwardly on the periphery of the driving member 7 of the spring motor, which periphery is normally of constant radius, and the driving member 7 normally serves to maintain the bar 32 in its uppermost position in which the signal arm 26 is thereby positioned in its uppermost or non-signaling position with the signal portion 28 of the signal arm substantially withdrawn upwardly from a position visible in the view finder, the field of which is defined by a usual mask 39, as shown in Figure 5.

The periphery of the driving member 7 of the spring motor is provided with an angularly extending cam depression 41 into which the lower end 38 of the bar 32 is engageable to permit downward movement of the bar 32 and of the signal arm 26 to position the signal portion 28 of the signal arm in its lowermost or extreme signaling position in which a maximum portion of the signal portion 28 is visible in the view finder, as shown in Figures 3 and 4, and to effect return of the signal arm into its non-signaling position, as shown in Figures 1 and 5, this action as shown being effective once during each revolution of the driving member 7.

A cam 42 is secured with the footage dial shaft 11 and is thus secured with the footage dial 9 for rotation therewith at the rate of one revolution to a plurality of revolutions of the driving member 7 of the spring motor through the reduction driving train hereinbefore described. A lateral projection 43 on the upper end of the bar 32 engages downwardly on the periphery of the cam member 42, which periphery is normally of constant radius, and this cam member normally serves to maintain the bar 32 in an intermediate vertical position in which the signal arm 26 is thereby positioned in an intermediate signaling position, between the aforesaid non-signaling and extreme signaling positions thereof, in which intermediate signaling position a minor portion of the signal portion 28 is visible in the view finder, as shown in Figures 2 and 6.

The periphery of the cam member 42 is provided with an angularly extending cam depression 44 into which the projection 43 of the bar 32 is engageable to permit downward movement of the bar 32 and the signal arm 26 to position the signal portion 28 of the signal arm in the aforesaid lowermost or extreme signaling position, as shown in Figures 3 and 4, and to effect return of the signal arm into its intermediate signaling position, as shown in Figures 2 and 6, this action as shown being effective once during each revolution of the cam member 42 and of the footage dial 9.

Assuming the camera to be loaded with an unexposed film, as by the insertion of a film magazine in the film chamber 4, the footage dial 9 is disposed at its starting or zero footage position in which the constant radius portion of the cam member 42 underlies the projection 43 of the bar 32 to limit downward movement of the signal arm 26 to its intermediate signaling position.

As the film is exposed due to the driving of the camera mechanism by rotation of the driving member 7 of the spring motor, the footage dial 9 and the cam member 42 are slowly moved in a clockwise direction in Figures 1, 2 and 3, the footage dial indicating the length of the film exposed. The depression 44 of the cam member 42 is so placed that it does not underlie the projection 43 until a predetermined run of the camera mechanism and the consequent exposure of a predetermined length of the film has taken place. When the depression 44 does underlie the projection 43, it permits downward movement of the signal arm 26 to its lowermost or extreme signaling position and thus indicates in the view finder the end of said predetermined run, namely that the film is fully exposed and that the camera requires reloading, it being observed that, in the extreme signaling position of the signal arm, the signal portion 28 effects a maximum obstruction of the view in the view finder with consequent maximum signal.

Observing that the footage dial 9 and the cam 42 have a one revolution cycle, the driving member 7 of the spring motor rotates a plurality of revolutions to one of the footage dial and the cam. As the driving member 7 rotates, its periphery normally maintains the signal arm 26 in its uppermost or non-signaling position by upward engagement thereof with the lower end 38 of the bar 32, as shown in Figures 1 and 5. When the cam depression 41 of the driving member 7 underlies the end 38, it permits downward movement of the signal arm 26 to its lowermost position, which occurs a plurality of times during the aforesaid predetermined run of the camera mechanism.

However, due to the fact that, during the aforesaid predetermined run of the camera mechanism, the constant radius portion of the cam member 42 underlies the projection 43 of the bar 32, the signal arm 26 may only move to its aforesaid intermediate signaling position during said aforesaid predetermined run when the cam depression 41 underlies the end 38, which results in a different or minimum signal being visible in the view finder at predetermined intervals during said predetermined run of the camera mechanism, as shown in Figures 2 and 6, namely to indicate predetermined scene lengths.

At the end of the said predetermined run of the camera mechanism, the cam depression 41 underlies the lower end 38 of the slide bar 32 simultaneously with the cam depression 44 underlying the projection 43 of the slide bar 32. Thus at the end of said predetermined run, the signal arm 26 is positioned in its extreme or maximum signaling position (Figures 3 and 4), at said predetermined intervals the signal arm 26 is positioned in a different or intermediate signaling position (Figures 2 and 6), and between said intervals the signal arm 26 is positioned in non-signaling position (Figures 1 and 5). The extreme end of the signal portion 28 of the signal arm 26 is preferably decreased in width, as designated at 45, to form a lesser obstruction of the view of the view finder, to the end that, while the aforesaid predetermined run intervals are signaled in the view finder, such signal does not substantially obstruct the view through the view finder in the event that it is desired to continue the camera operation beyond a signaled interval.

As hereinbefore described, the camera is of the magazine loading type and has a magazine chamber, indicated at 4 in Figure 7, in which a film magazine is interchangeably accommodated. A transversely disposed ejector plunger 46 extends across between and is slidably mounted in alined apertures 47 and 48 respectively through the frame plates 2 and 3, as best shown in Figure 7. A compression spring 49 encircles the plunger 46 and operates between the frame plate 3 and a shoulder 51 on the plunger to yieldably urge the plunger into non-ejecting position or to the right in Figure 7, a flange 52 on the plunger being engageable against the frame plate 2 to limit movement of the plunger in this direction.

The outer end 53 of the ejector plunger projects into an inwardly counterbored aperture 54 through the camera casing 1, so that the plunger may be manually actuated into its ejecting position in opposition to the spring 49 or to the left as shown in Figure 7. In this ejecting movement, the inner end 55 of the plunger is projected into the magazine chamber 4 to engage against a film magazine in the chamber and move it out of its seated position in the chamber for the convenient removal of the magazine.

A latch lever 56 is intermediately pivoted on the frame plate 2 by means of a transversely arranged elongated aperture 57 through the intermediate portion of the lever engaging on a stud structure 58 on the plate 2, as best shown in Figure 8. A spring 59 is operative on the latch lever to normally maintain one end of the aperture 57 against the stud structure 58 and to yieldably permit movement of the lever longitudinally of the aperture 57, thus forming a yieldable pivot mounting for the latch lever. The spring 59 also serves to yieldably urge the latch lever in one direction of its pivotal movement, i. e., to the right in Figures 1, 2, 3 and 8.

One end of the latch lever is provided with a latch shoulder 61, which in the pivotal positioning of the latch lever by the spring 59, see Figures 2 and 3, engages the flange 52 of the ejector plunger 46 axially of the plunger to lock the plunger in non-ejecting position, thus preventing manual actuation of the ejector plunger to eject the film magazine, the latch lever being operable in its pivotal movement out of locking position, see Figures 1, 7 and 8, to release the ejector plunger for manual actuation into ejecting position. Lugs 62 and 63 on the frame plate 2 slidably engage the latch lever on opposite sides of the pivotal axis thereof, see Figure 8, to laterally position the same.

The end of the latch lever 56 opposite that carrying the latch shoulder 61, designated at 64, lies in the region of the cam member 42. The cam member 42 is provided with a cam lug 65 in which the rotation of the footage dial and cam member engages the end 64 of the latch lever to actuate the latch lever in opposition to the spring 59 and release the latch shoulder 61 from the flange 52 to permit ejecting movement of the ejector plunger 46, as shown in Figures 1, 7 and 8, the spring 59 returning the latch lever to latching position when the cam lug 63 disengages from the end 64 of the latch lever.

The lug 65 is so positioned, angularly of the single revolution footage dial 9 and the cam member 42, that it releases the latch lever 56 approximately at the end of the aforesaid predetermined run of the camera mechanism, as shown at a short interval after said predetermined run, thus preventing ejection of the magazine until the film therein has been fully exposed.

The spring 59 in cooperation with the elongated mounting aperture 57 of the latch lever provides a yieldable pivotal mounting for the latch lever, so that in the event that ejecting pressure is exerted on the ejector plunger 46 when the cam lug 65 engages the latch lever, the mounting thereof will yield to prevent damage to the mechanism.

While I have thus described my invention, I do not wish to be limited to the precise details described, as changes may be readily made without departing from the spirit of my invention, but having thus described my invention, I claim as new and desire to secure by Letters Patent the following:

1. In a photographic camera of the sequential exposure type, the combination with a signal member reciprocable into and out of an extreme signaling position and having an intermediate signaling position, of means tending to move said signal member from non-signaling position into said extreme signaling position, single cycle means under the control of the camera mechanism and operative to normally prevent movement of said signal member from said intermediate signaling position into said extreme signaling position and to release said signal member for movement into said extreme signaling position at the end of a predetermined run of the camera mechanism and after such a release to actuate said signal member into said intermediate signaling position, and plural cycle means under the control of the camera mechanism and operative in timed relation with said single cycle means to normally prevent movement of said signal member out of non-signaling position and to release said signal member for movement into said intermediate position defined by said single cycle means at predetermined intervals during said run of the camera mechanism and after such release to actuate said signal member into said non-signaling position, the final release of said signal member by said plural cycle means occurring simultaneously with release of said single cycle means, thereby permitting movement of said signal member to said extreme signaling position.

2. In a photographic camera of the sequential exposure spring motor driven type, the combination with a rotatable camera mechanism driving member of a spring motor, of a rotatable film footage indicating dial, a driving train operative to drive said footage dial a single revolution to a plurality of revolutions of said driving member, a signal member reciprocable into and out of an extreme signaling position and having an intermediate signaling position, means operative to position said signal member in said extreme signaling position at the end of a predetermined run of the camera mechanism and including a rotatable cam element driven by said driving train a single revolution to a plurality of revolutions of said driving member, and means operative to position said signal member in said intermediate signaling position at predetermined intervals during said run of the camera mechanism including a second rotatable cam element driven by said driving member in one to one revolution relation therewith.

3. In a photographic camera of the sequential exposure type, the combination with a view finder of the camera, of a signal member reciprocable into and out of an extreme signaling position visible in said view finder and having an intermediate signaling position also visible in said view finder, of means tending to move said signal member from non-signaling position into said extreme signaling position, single cycle means under the control of the camera mechanism and operative to normally prevent movement of said signal member from said intermediate signaling position into said extreme signaling position and to release said signal member for movement into said extreme signaling position at the end of a predetermined run of the camera mechanism and after such release to actuate said signal member into said intermediate signaling position, and plural cycle means under the control of the camera mechanism and operative in timed relation with said single cycle means to normally prevent movement of said signal member out of non-signaling position and to release said signal member for movement into said intermediate position defined by said single cycle means at predetermined intervals during said run of the camera mechanism and after such release to actuate said signal member into said non-signaling position, the final release of said signal member by said plural cycle means occurring simultaneously with release of said single cycle means, thereby permitting movement of said signal member to said extreme signaling position.

4. In a photographic camera of the sequential exposure spring motor driven type, the combination with a view finder of the camera, of a rotatable camera mechanism driving member of a spring motor, a rotatable film footage indicating dial, a driving train operative to drive said footage dial a single revolution to a plurality of revolutions of said driving member, a signal member reciprocable into and out of an extreme signaling position visible in said view finder and having an intermediate signaling position also visible in said view finder, means operative to position said signal member in said extreme signaling position at the end of a predetermined run of the camera mechanism and including a rotatable cam element driven by said driving train a single revolution to a plurality of revolutions of said driving member, and means operative to position said signal member in said intermediate signaling position at predetermined intervals during said run of the camera mechanism including a second rotatable cam element driven by said driving member in one to one revolution relation therewith.

JOHN G. ZUBER.